(12) United States Patent
Haydon et al.

(10) Patent No.: US 12,277,197 B2
(45) Date of Patent: *Apr. 15, 2025

(54) USING NEURAL NETWORK TO CLASSIFY RELATIONSHIP FOR SECURE LENDING OF DIGITAL CONTENT

(71) Applicant: Sony Interactive Entertainment Inc.

(72) Inventors: David Haydon, San Diego, CA (US);
Monica Dabaghi, San Diego, CA (US);
Urson Urbanik, San Diego, CA (US);
Cullen Coughlin, San Diego, CA (US);
Yun Chen, San Diego, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,440

(22) Filed: Sep. 1, 2023

(65) Prior Publication Data
US 2023/0418913 A1    Dec. 28, 2023

Related U.S. Application Data

(63) Continuation of application No. 16/704,420, filed on Dec. 5, 2019, now Pat. No. 11,748,456.

(51) Int. Cl.
  *G06F 21/10* (2013.01)
  *G06N 20/00* (2019.01)

(52) U.S. Cl.
  CPC ............ *G06F 21/105* (2013.01); *G06F 21/10* (2013.01); *G06N 20/00* (2019.01)

(58) Field of Classification Search
  CPC ....... G06F 21/105; G06F 21/10; G06N 20/00; G06N 3/0445; G06N 3/0454; G06N 3/08
  See application file for complete search history.

(56) References Cited

U.S. PATENT DOCUMENTS

| 8,364,595 B1 * | 1/2013 | Ringewald | G06Q 30/0601 726/4 |
| 9,460,461 B1 * | 10/2016 | Gill | G06Q 30/0641 |
| 10,089,611 B1 * | 10/2018 | Eisher | G06Q 20/1235 |

(Continued)

OTHER PUBLICATIONS

Final Office Action for U.S. Appl. No. 16/704,420, dated Oct. 19, 2022.

(Continued)

*Primary Examiner* — Khalid M Almaghayreh
(74) *Attorney, Agent, or Firm* — Kilpatrick Townsend & Stockton LLP (57) ABSTRACT

In a server configured to operate on a network, secured access to shared digital content may be implemented by analyzing information about a first user and a second user with a neural network trained with a machine learning algorithm to determine a relationship between the first and second users. The first user may be granted access to one or more content items belonging to the second user based on the determined relationship and the second user's access to the one or more content items may be disabled. The first user's access to the content items may be disabled when the second user requests access to them and access of the content items may be returned to the second user after access for the first user to the one or more content items has been disabled.

23 Claims, 7 Drawing Sheets

(56) References Cited

U.S. PATENT DOCUMENTS

| | | | |
|---|---|---|---|
| 10,375,432 B1* | 8/2019 | Matthews | H04N 21/4532 |
| 2005/0251675 A1* | 11/2005 | Marcjan | G06F 21/6218 |
| | | | 713/100 |
| 2008/0091834 A1* | 4/2008 | Norton | G06Q 10/00 |
| | | | 709/229 |
| 2008/0109910 A1* | 5/2008 | Day | G06F 21/10 |
| | | | 726/27 |
| 2008/0270307 A1* | 10/2008 | Olson | G06F 21/10 |
| | | | 705/51 |
| 2009/0216859 A1* | 8/2009 | Dolling | H04L 63/126 |
| | | | 726/4 |
| 2011/0113098 A1* | 5/2011 | Walsh | H04L 67/14 |
| | | | 709/204 |
| 2012/0254303 A1* | 10/2012 | Anbalagan | G06Q 50/01 |
| | | | 709/204 |
| 2013/0198811 A1* | 8/2013 | Yu | H04L 63/08 |
| | | | 726/4 |
| 2013/0204398 A1* | 8/2013 | Minamizawa | H04L 63/101 |
| | | | 700/11 |
| 2015/0020151 A1* | 1/2015 | Ramanathan | G06F 21/10 |
| | | | 726/1 |
| 2015/0101069 A1* | 4/2015 | Stappenbeck | G06F 21/10 |
| | | | 726/30 |
| 2015/0127836 A1* | 5/2015 | Bae | H04L 67/141 |
| | | | 709/227 |
| 2015/0222606 A1* | 8/2015 | Yan | H04L 63/0428 |
| | | | 713/171 |
| 2015/0331885 A1* | 11/2015 | Bastide | G06F 16/176 |
| | | | 707/608 |
| 2016/0256781 A1* | 9/2016 | Bronstein Bendayan | |
| | | | H04L 67/306 |
| 2016/0373548 A1* | 12/2016 | Fails | H04L 63/102 |
| 2017/0126689 A1* | 5/2017 | Lloyd | G06F 3/04817 |
| 2017/0147527 A1* | 5/2017 | Chandrasekaran | H04L 67/10 |
| 2019/0026482 A1* | 1/2019 | Kenny | G09B 7/00 |
| 2019/0207946 A1* | 7/2019 | Mertens | G06F 21/6245 |
| 2019/0236470 A1* | 8/2019 | Chauhan | G06N 5/047 |
| 2019/0347181 A1* | 11/2019 | Cranfill | G06F 11/3013 |
| 2019/0356672 A1* | 11/2019 | Bondugula | H04L 63/205 |
| 2020/0065509 A1* | 2/2020 | Ojha | H04L 67/06 |
| 2020/0104898 A1* | 4/2020 | Cui | G06Q 30/0633 |
| 2020/0107165 A1* | 4/2020 | Pai | H04W 12/047 |
| 2021/0056153 A1* | 2/2021 | Giordani | G06Q 50/01 |
| 2021/0117982 A1* | 4/2021 | Johnson | G06F 21/6245 |
| 2021/0133509 A1* | 5/2021 | Wall | G06F 18/285 |
| 2021/0173899 A1 | 6/2021 | Haydon et al. | |
| 2022/0191769 A1* | 6/2022 | Breaux, III | H04M 1/72463 |

OTHER PUBLICATIONS

International Search Report and Written Opinion dated Jan. 22, 2021 for International Patent Application No. PCT/US2020/057526.

Non-Final Office Action for U.S. Appl. No. 16/704,420, dated Jan. 3, 2023.

Non-Final Office Action for U.S. Appl. No. 16/704,420, dated Mar. 31, 2022.

Notice of Allowance for U.S. Appl. No. 16/704,420, dated Apr. 13, 2023.

* cited by examiner

USING NEURAL NETWORK TO CLASSIFY RELATIONSHIP FOR SECURE LENDING OF DIGITAL CONTENT

CLAIM OF PRIORITY

This application is a continuation of U.S. patent application Ser. No. 16/704,420, filed Dec. 5, 2019, the entire contents of which are incorporated herein by reference.

FIELD OF THE DISCLOSURE

The present disclosure relates to sharing of digital content. In particular, aspects of the present disclosure relate to systems and methods for secure access to digital content by different users entitled to access the content.

BACKGROUND OF THE DISCLOSURE

Many computer applications, particularly video games, are often shared among multiple users. With the increasing prevalence of entirely digital application stores and the reliance on digital rights management (DRM) protection, the ability of a given user to access applications via multiple devices on-demand has greatly increased. However, if a user wishes to share access to an application with a family member this is often only possible by lending the user's device or to take action necessary to give the family member access. This is often impractical.

Many software applications are sold with a "site license" that allows a given application to be installed on certain number of computers. This is practical for business-related software as most users have their own devices but it is impractical in household situations.

In many households different members of the same family may have access to different applications associated with a common platform, such as a video game console or online store associated with a network. Access to these applications is often restricted to their respective "owners" who, though they may be members of the same family, are different individuals. There is a need in the art for a way to allow users of computer applications to both share and restrict access to those applications.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

Some gaming consoles are associated with individual persons who are, in turn, associated with corresponding accounts. In some such cases, account holders are able to set a given device as their primary console. The term "primary console", as used herein, refers to a device on which a user can always access the content regardless of network/internet connectivity. An account holder can allow others to play content on the primary console through the account holder's access pipe. It would be desirable in some circumstances for different user's accounts to be configured to freely share content associated with that account. This may include content downloaded onto a given user's device as well as that which is not loaded on the device. Such implementations are often useful among people, who are related in some way, e.g., as members of a family or other close association of individuals.

Once a family relationship has been established, e.g., by entry of information attesting to a familial relationship, some systems allow any family member can access any content owned by any members of the family. In some cases this may be possible even if when the family member that owns the content is offline. The biggest technical hurdle to such systems is how to verify that a person requesting access to content is a "trusted" person with whom content can safely be shared. A root complexity is to associate a console not just with corresponding accounts—but with "people", i.e., to be able to attribute relationship status and gating based on characteristics of the "person owning the account".

According to aspects of the present disclosure, a machine learning system may analyze a user database to determine relationships between actors in a transaction involving access to shared content. Such a system could look at, e.g., social media profiles and geolocation information to see if two users are friends or family members or otherwise identify good actors versus bad actors for the purpose of granting or denying access to requested shared content.

According to additional aspects of the present disclosure, user acquisition of virtual assets for computer applications may be facilitated by an automated system that determines which applications are relevant to the user and which assets are available for those applications. This information may be filtered so that the relevant applications and available assets can be presented to the user in an organized way that reduces the amount of manual searching the user must do.

System

Figure 1A:
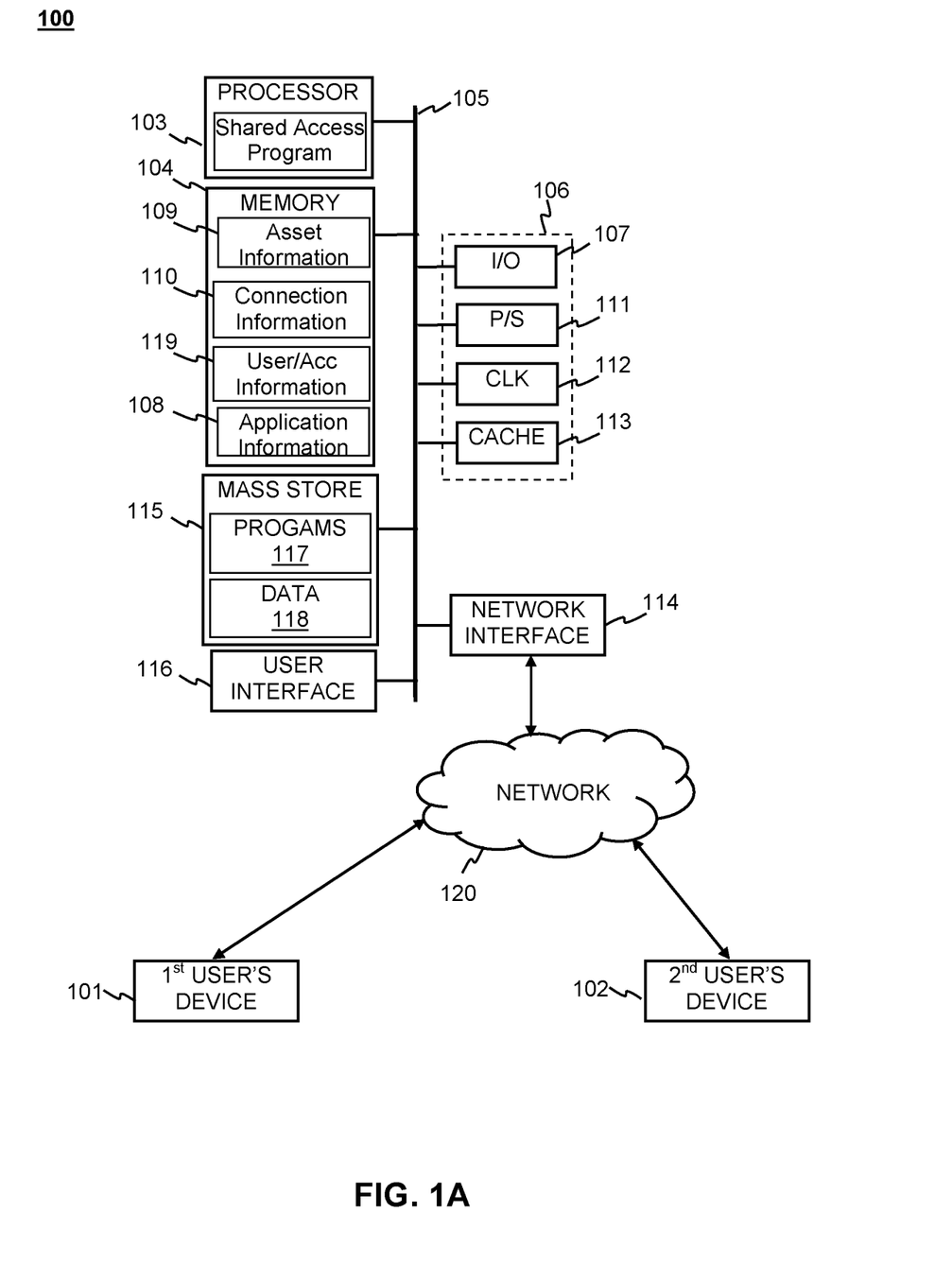
FIG. 1A is a schematic diagram of a system that allows secure access to shared digital content according to aspects of the present disclosure.

FIG. 1A depicts the system 100 configured to facilitate secure access to shared digital content according to aspects of the present disclosure. The system 100 may also facilitate acquisition of virtual assets associated with a user according to additional aspects of the present disclosure. The system 100 may operate in conjunction with one or more user devices, e.g., a first user device 101 and a second user device 102.

The system 100 may include one or more processor units 103, which may be configured according to well-known architectures, such as, e.g., single-core, dual-core, quad-core, multi-core, processor-coprocessor, cell processor, and the like. The market place server may also include one or more memory units 104 (e.g., random access memory (RAM), dynamic random access memory (DRAM), read-only memory (ROM), and the like).

The processor unit 103 may execute one or more programs 117, portions of which may be stored in the memory 104 and the processor 103 may be operatively coupled to the memory, e.g., by accessing the memory via a data bus 105. The programs 117 may be configured to facilitate secure access to shared digital content according to the method 150 described below with respect to FIG. 1B. The programs 117 may also include programs configured to facilitate purchase of virtual assets for applications 108 according to the methods described below with respect to FIG. 3, FIG. 4, FIG. 5 and FIG. 6. Additionally the Memory 104 may contain information about connections 110 between the system and one or more client devices 101, 102. Such connection information may include, e.g., internet protocol (IP) addresses, network address translator (NAT) traversal information, and connection performance information, such as bandwidth and latency. In addition, the Memory 104 may contain user account information 119, such as account identifiers, user profile information, and data indicating which applications are available to a given user. The Memory 104 may also contain data corresponding to virtual assets for the application 109. Alternatively, the virtual may be included in application data 108 or in a separate database (not shown). The virtual assets, applications and connection information may also be stored as data 118 in the Mass Store 115.

The system 100 may also include well-known support circuits, such as input/output (I/O) 107, circuits, power supplies (P/S) 111, a clock (CLK) 112, and cache 113, which may communicate with other components of the system, e.g., via the bus 105. The computing device may include a network interface 114. The processor unit 103 and network interface 114 may be configured to implement a local area network (LAN) or personal area network (PAN), via a suitable network protocol, e.g., Bluetooth®, for a PAN. The computing device may optionally include a mass storage device 115 such as a disk drive, CD-ROM drive, tape drive, flash memory, or the like, and the mass storage device may store programs and/or data. The marketplace server may also include a user interface 116 to facilitate interaction between the system and a user. The user interface may include a monitor, Television screen, speakers, headphones or other devices that communicate information to the user.

The system server 100 may include a network interface 114 to facilitate communication via an electronic communications network 120. The network interface 114 may be configured to implement wired or wireless communication over local area networks and wide area networks such as the Internet. The device 100 may send and receive data and/or requests for files via one or more message packets over the network 120. Message packets sent over the network 120 may temporarily be stored in a buffer in memory 104.

Although for simplicity the application 108 is shown as being stored in memory 104 on the marketplace server 100 aspects of the present disclosure are not limited to such implementations. In alternative implementations, code and data for the application 108 may be stored on a separate application server that can be remotely accessed by the system 100 and the client devices 101, 102.

Method

Figure 1B:
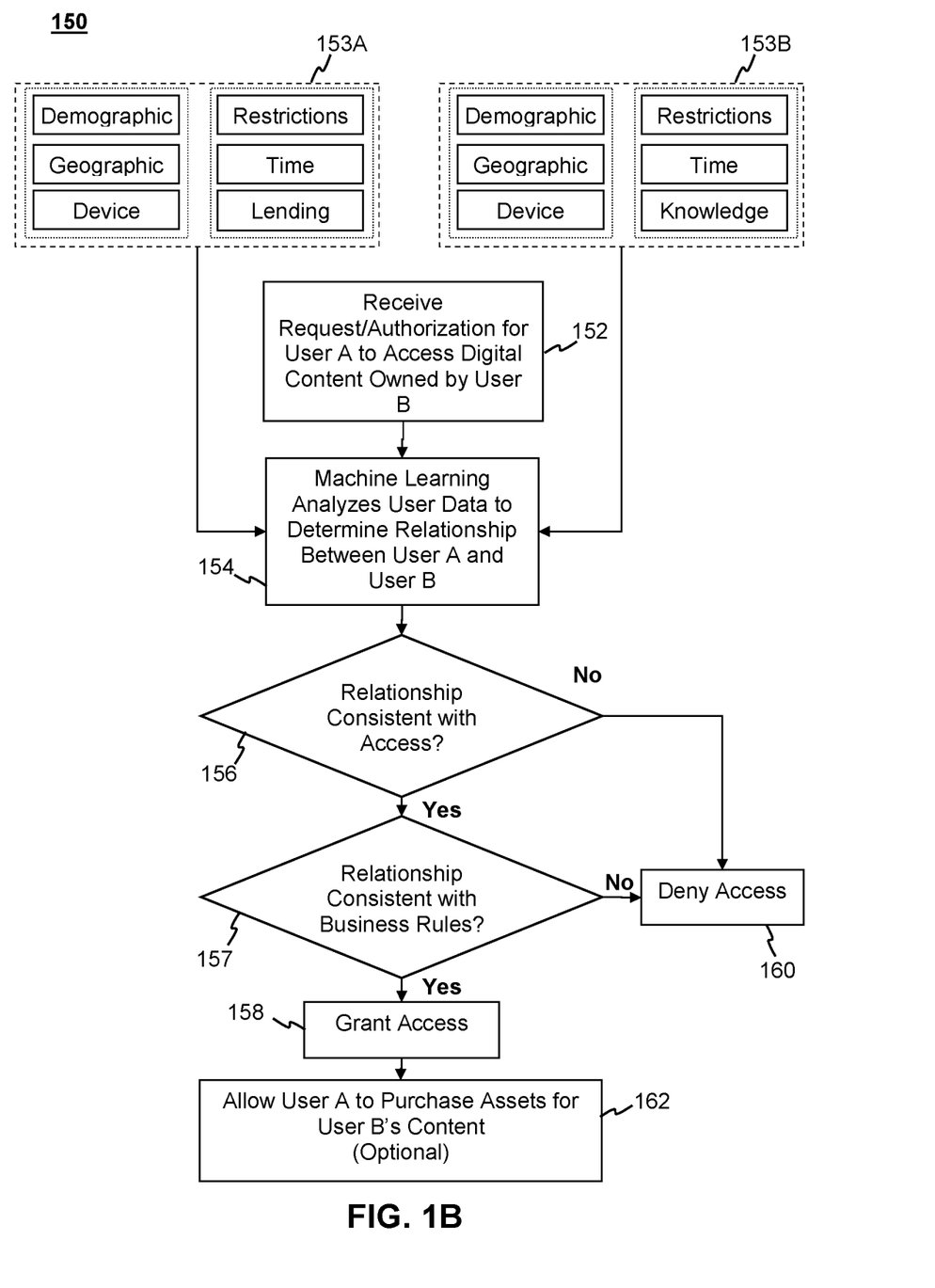
FIG. 1B is a flow diagram of a system that allows secure access to shared digital content according to aspects of the present disclosure.

FIG. 1B depicts an example of a method 150 for secured access to shared digital content that may be implemented by a system such as that depicted in FIG. 1A. A first user (User A) requests access to one or more content items belonging to a second user (User B), as indicated at 152, e.g., by accessing the system 100 of FIG. 1 through a device connected to the network 120. It is noted that the request at 152 may be bi-directional. User B can push (i.e., attempt to authorize access) to the User A or User A can request/pull access from User B. It is further noted that the request 152 can be a request from User A to join a group that User B belongs to so that User A can access one or more content items belonging to the group. The content items may include, media presentations, computer programs, e.g., games, data relating to assets usable with programs, e.g., game add-ons, and the like.

The system analyzes information 153A about User A and information 153B about User B with a machine learning algorithm to determine a relationship between the User A and User B, as indicated at 154. The system may select different information for the lending user 153A and the borrowing user 153B to perform this analysis, as will be discussed below. Once the relationship is determined, the system then determines whether the relationship is consistent with granting access, as indicated at 156. Depending on whether the relationship is consistent with access and access is consistent with business rules at 157, access is then either granted at 158 or denied at 160 according to the determination. In some implementations, once access is granted, the system may optionally allow the first user to purchase assets (e.g., add-ons) for the User B's content. According to aspects of the present disclosure, the request and/or granting actions may be available to be initiated by either lender or borrower. For example, the lender could select a friend and a game to share with them. Alternatively, a borrower could select a friend's content and request to borrow it. Furthermore, a grant of access that includes a grant of a request to join a group may include a grant of access to content items that belong to the group.

The information 153A, 153B may include information relating to interactions between the first and second user with each other. If the first user interacts with the second user frequently and regularly, they are more likely to be in some trusted relationship, e.g., as a friendship or familial relationship. In some cases, the information 153A, 153B may include information relating to interactions between the first or second user and one or more other users. For example, frequent and regular interaction between both users and a third user may support an inference that the first and second users are friends or family members, though it might not be dispositive.

In some implementations, the information 153A, 153B may include one or more user-defined data inputs. Two different user's having the same or similar user defined data inputs could support an inference that the two users are friends or family members.

In some implementations, the information 153A, 153B may relate to the identity of the one or more content items, which may include the identity of the content items, ownership of the content items and a history of use of the content items. Such information can be useful in determining a relationship if, e.g., the first user has previously been granted access to a content item owned by the second user.

In some implementations, the information 153A, 153B may relate to one or more familial relationships involving the first and/or second user, e.g., having the same last name, combined with a shared residence address. It is noted that the two users may be related, e.g., as siblings or spouses (or ex-spouses), but might not trust one another sufficiently to share access to content. The existence of a familial relationship, though useful, is not always dispositive.

In some implementations, the information 153A, 153B may relate to a device associated with the one or more items of digital content, the first user, or the second user. For example, the first user might have access to the second user's device, which would support an inference of a trusted relationship.

In some implementations, the information 153A, 153B may relate to location data relating to the first user, the second user, or a device associated with the one or more items of digital content, the first user, or the second user. If the first and second user's share the same address they could be in a familial relationship or other relationship involving trust. This may also be relevant whether to grant access. For example, in parental oversight situations, e.g., where the first user could be a child of the second user and the child could be located at school. The parent could deny access to shared content under such circumstances.

The information 153A, 153B could relate to an amount of time spent interacting with the one or more items of digital content. This is sometimes useful when a content provider (e.g., game provider) places a restriction on sharing depending on the amount of time content is used. Lastly, the information 153A, 153B may relate to an account associated with the one or more items of digital content. In some circumstances, there may be restrictions upon whether an account can be accessed by anyone other than the account holder.

The foregoing examples of the information 153A, 153B are not limiting. Those of skill in the art will be able to devise other types of information that could be used to determine a relationship or to determine whether to grant or deny access.

Once a relationship is established, there a number of ways to determine whether to grant or deny access based on the determined relationship at 156.

By way of example, and not by way of limitation, the first user may be granted access to the second user's content according to one or more restrictions based on a category analysis, e.g. when it is determined that the first user and second user have previously played other games together, or it is determined that the first user and second user have communicated via the platform for n months previously. Access may also be granted or denied according to whether the first user can demonstrate possession of shared knowledge between the first and second user that is not user defined. By way of example, the system 100 may ask the first user a challenge question like, "what game do you and the first user play most often?" The system may be able to determine this from data regarding both users' patterns of game play in the information 153A, 153B. A correct answer to this question would demonstrate shared knowledge.

Once a relationship has been established, the system may then consider business rules at 156 to determine whether granting access is consistent with such rules. Business rules may depend on a number of various restrictions, e.g., number of times content has been shared, or number of users accessing the shared content etc. These restrictions may be included in the information 153A, 153B.

In some circumstances, access may also be granted or denied according to a time of day. Some games may restrict access to children during school hours, for example. In some implementations, granting or denying access may depend on a number of users currently accessing the one or more content items. Some applications, e.g., video games, place restrictions on the number of users who can be granted concurrent access. Other content items may have restrictions on a number of times the one or more content items have been accessed. This latter restriction could be based on a variety of dynamics, e.g., the borrower has accessed borrowed content too many times, or the lender has shared content too many times, or specific to the game/content, that game has been shared by the lender too many times etc. Still other content items may have restrictions on how many times they may be accessed by anyone other than their owner and may particularly limit the number of times they may be accessed by the first user. Alternatively, the system 100 may limit access according to a number of other users to whom the second user is currently granting access to content items belonging to the second user.

Machine Learning

The machine learning program that determines relatedness of two users may be implemented using one or more trained Neural Networks (NNs). Generally, neural networks may include one or more of several different types of neural networks and may have many different layers. By way of example and not by way of limitation the classification neural network may consist of one or multiple convolutional neural networks (CNN), recurrent neural networks (RNN) and/or dynamic neural networks (DNN).

Figure 2A:
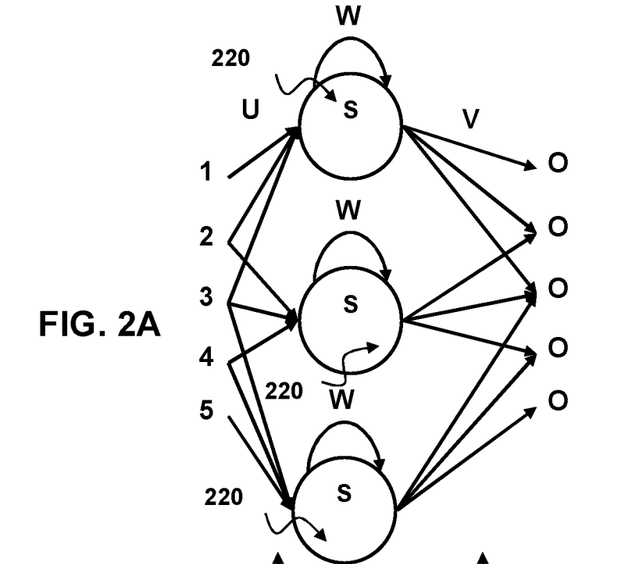
FIG. 2A is a simplified node diagram of a recurrent neural network for use in secure access to shared digital content according to aspects of the present disclosure.
Figure 2B:
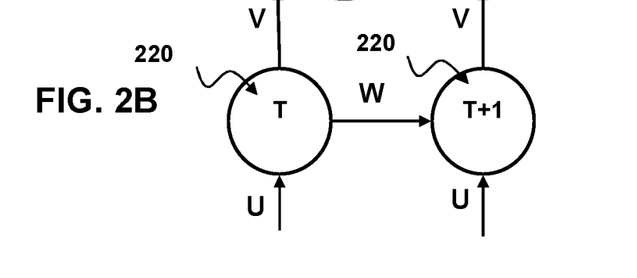
FIG. 2B is a simplified node diagram of an unfolded recurrent neural network for use in secure access to shared digital content according to aspects of the present disclosure.

By way of example, and not by way of limitation, FIG. 2A depicts the basic form of an RNN having a layer of nodes 220, each of which is characterized by an activation function S, one input weight U, a recurrent hidden node transition weight W, and an output transition weight V. The activation function S may be any non-linear function known in the art and is not limited to the (hyperbolic tangent (tanh) function. For example, the activation function S may be a Sigmoid or ReLu function. Unlike other types of neural networks, RNNs have one set of activation functions and weights for the entire layer. As shown in FIG. 2B, the RNN may be considered as a series of nodes 220 having the same activation function moving through time T and T+1. Thus, the RNN maintains historical information by feeding the result from a previous time T to a current time T+1.

In some embodiments, a convolutional RNN may be used. Another type of RNN that may be used is a Long Short-Term Memory (LSTM) Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997), which is incorporated herein by reference.

Figure 2C:
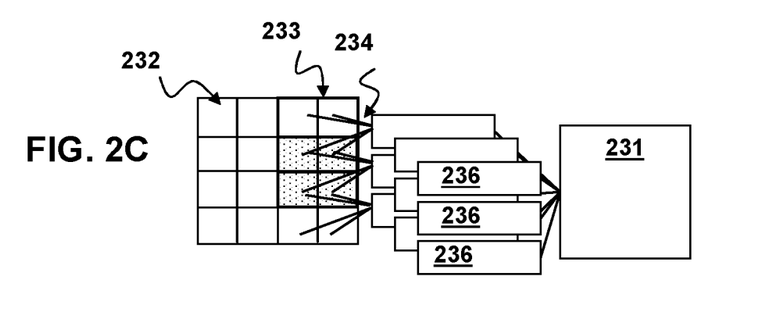
FIG. 2C is a simplified diagram of a convolutional neural network for use in secure access to shared digital content according to aspects of the present disclosure.

FIG. 2C depicts an example layout of a convolution neural network such as a CRNN according to aspects of the present disclosure. In this depiction, the convolution neural network is generated for training data in the form of an array 232, e.g., with 4 rows and 4 columns giving a total of 16 elements. The depicted convolutional neural network has a filter 233 size of 2 rows by 2 columns with a skip value of 1 and a channel 236 of size 9. For clarity in FIG. 2C only the connections 234 between the first column of channels and their filter windows is depicted. Aspects of the present disclosure, however, are not limited to such implementations. According to aspects of the present disclosure, the convolutional neural network that implements the classification 229 may have any number of additional neural network node layers 231 and may include such layer types as additional convolutional layers, fully connected layers, pooling layers, max pooling layers, local contrast normalization layers, etc. of any size.

Figure 2D:
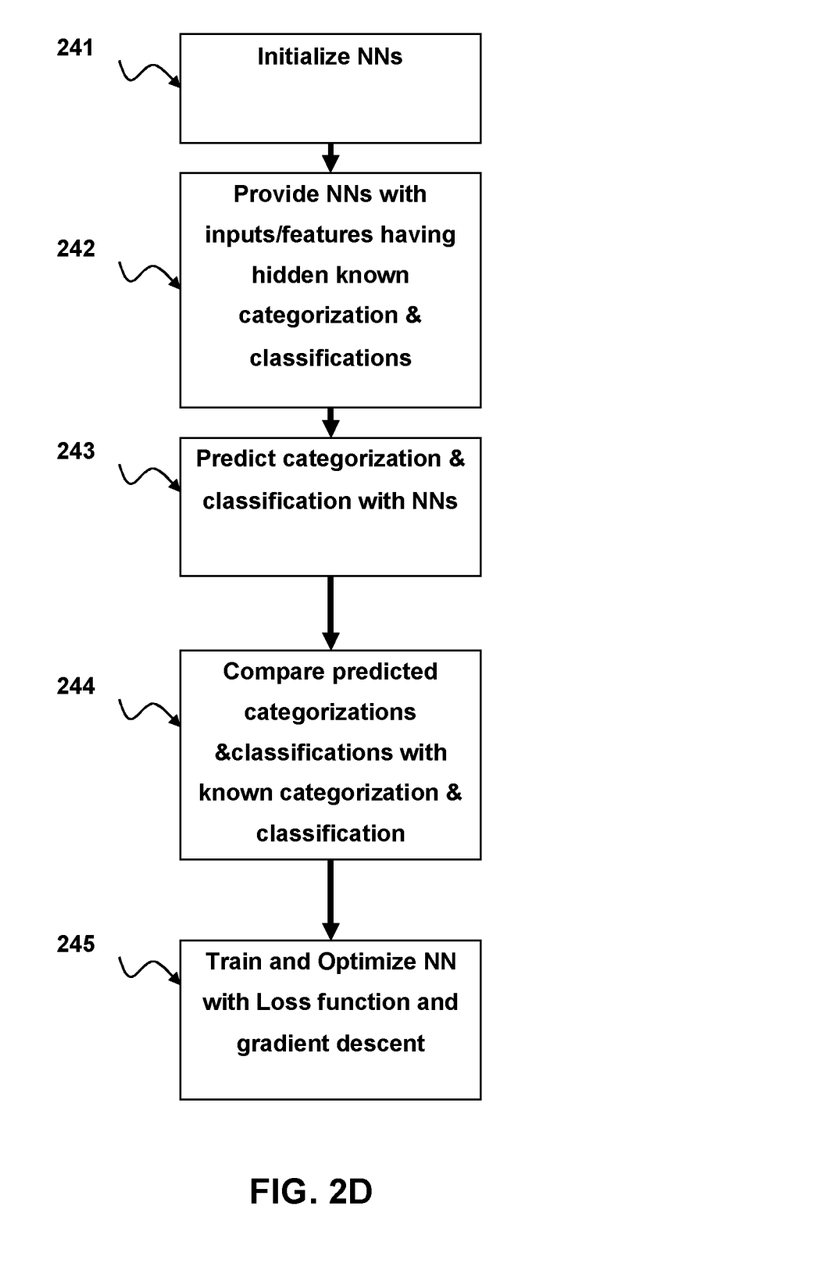
FIG. 2D is a block diagram of a method for training a neural network in secure access to shared digital content according to aspects of the present disclosure.

As seen in FIG. 2D Training a neural network (NN) begins with initialization of the weights of the NN 241. In general, the initial weights should be distributed randomly. For example, an NN with a tanh activation function should have random values distributed between $$-\frac{1}{\sqrt{n}} \text{ and } \frac{1}{\sqrt{n}}$$

where n is the number of inputs to the node.

After initialization the activation function and optimizer is defined. The NN is then provided with a feature vector or input dataset 242. Each of the different features vectors may be generated by the NN from inputs that have known labels. Similarly, the NN may be provided with feature vectors that correspond to inputs having known labeling or classification. The NN then predicts a label or classification for the feature or input 243. The predicted label or class is compared to the known label or class (also known as ground truth) and a loss function measures the total error between the predictions and ground truth over all the training samples 244. By way of example and not by way of limitation the loss function may be a cross entropy loss function, quadratic cost, triplet contrastive function, exponential cost, etc. Multiple different loss functions may be used depending on the purpose. By way of example and not by way of limitation, for training classifiers a cross entropy loss function may be used whereas for learning pre-trained embedding a triplet contrastive function may be employed. The NN is then optimized and trained, using the result of the loss function and using known methods of training for neural networks such as backpropagation with adaptive gradient descent etc. 245. In each training epoch, the optimizer tries to choose the model parameters (i.e., weights) that minimize the training loss function (i.e. total error). Data is partitioned into training, validation, and test samples.

During training, the Optimizer minimizes the loss function on the training samples. After each training epoch, the mode is evaluated on the validation sample by computing the validation loss and accuracy. If there is no significant change, training can be stopped and the resulting trained model may be used to predict the labels of the test data.

Thus, the neural network may be trained from inputs having known labels or classifications to identify and classify those inputs.

Acquiring Virtual Assets in a Borrowed Application

Figure 3:
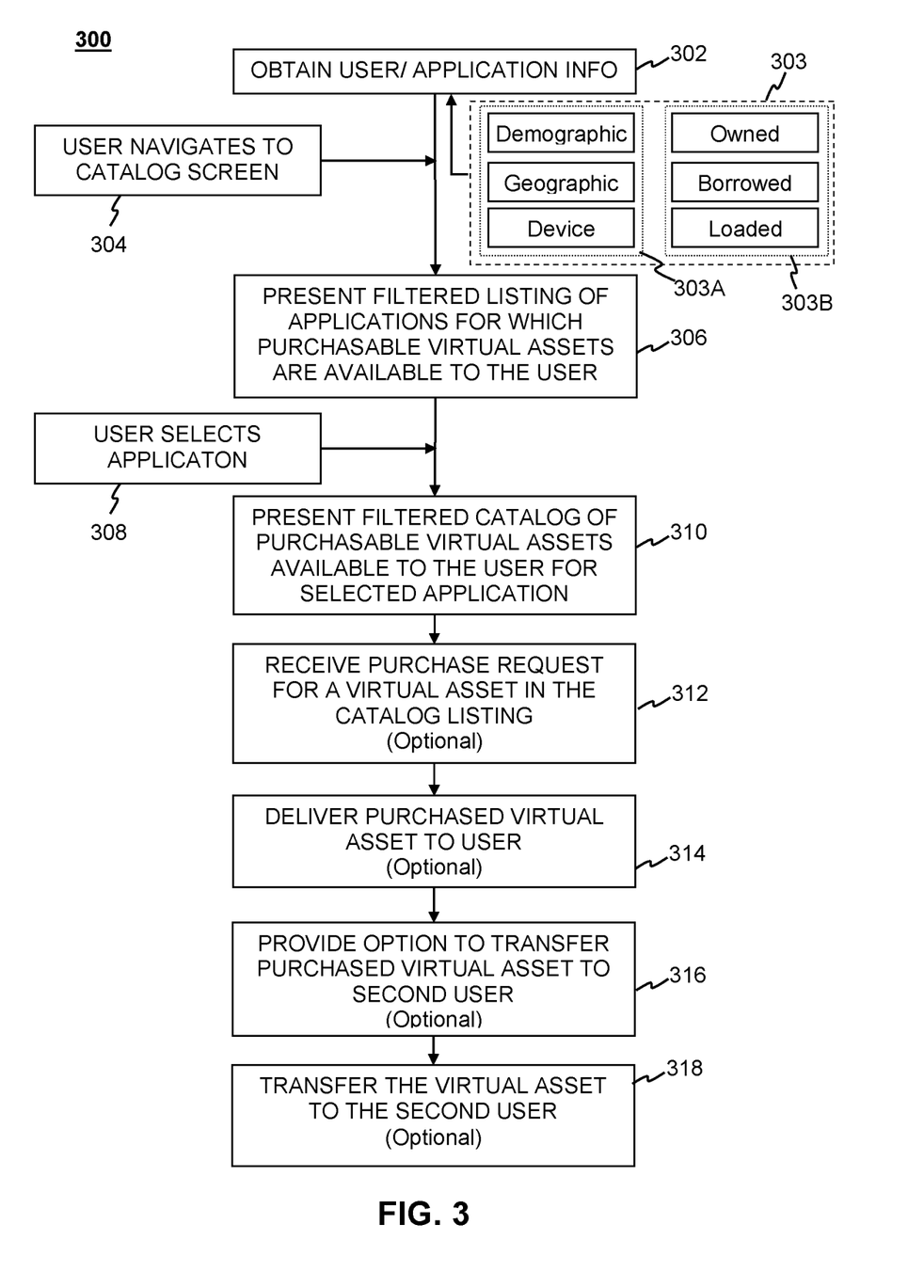
FIG. 3 is a flow diagram of a method for acquiring virtual assets in a borrowed application according to an embodiment of the present invention.

As noted above, aspects of the present disclosure include implementations in which a user who has been granted access to shared, but un-owned, content may acquire virtual assets for use with that content. The flow diagram of FIG. 3 shows an example of a computer-implemented method 300 for facilitating acquisition of virtual assets for computer applications according to these additional aspects of the present disclosure. According to the illustrated method a computer system may obtain information about a user and information 303 about one or more computer applications associated with the user, as generally indicated at 302. The information 303 generally includes user-related information 303A and application-related information 303B.

The user information 303A may include, e.g., demographic information, geographic information, and device information. Demographic information generally includes things like the user's age, marital status, economic status, and other defining characteristics about the user. Geographic information may include things like the user's current jurisdiction of residence, e.g., city, county, state, province, country or the user's current physical location. This can be determined, e.g., from a GPS or the Internet Protocol (IP) Geolocation or other location-sensing component of a device that the user uses to access the system. Device information may include information about one or more devices associated with the user. Such information may include, e.g., device ID, IP address, device capabilities, e.g., processor type, processor speed, memory space available, storage space (e.g., hard disk space) available, and the like.

The application information 303B may include information identifying which applications the user owns, has borrowed, is otherwise associated with, e.g., applications the user has access to through a joint account with other users or through a device shared with other users. The application information may also include information identifying the corresponding producer, operating system, and/or version for such applications. In some implementations, the application information 303B may include information identifying which application or applications are currently loaded on the device the user is using access the system through which the user attempts to acquire virtual assets for those applications.

The system may obtain the information in several different ways. By way of example, the system may be implemented locally on a device through which the user interacts with the applications. In some such cases the applications may be loaded onto the device, e.g., a computer, laptop, or gaming console, through some physical medium, such as a compact disc (CD) or universal serial bus (USB) drive, e.g., a flash drive. In such implementations, the user's device may keep track of every application loaded into the device. In other implementations, the user's device accesses the applications on a remote server via a network, such as the internet. The user's applications, i.e., those the user can access, may be associated with an account through which the user can access the applications and associated data. In such cases, either the user's device or the remote server may keep track of each application the user can access.

When the user navigates a device to a catalog screen for virtual assets for computer applications, as indicated at 304, the system automatically presents to the user a filtered listing of applications for which virtual assets are available to the user, as indicated at 306. The user may navigate to the catalog screen in any suitable manner, e.g., through a graphical user interface if the system is local to the user's device or through a web browser if the system is on a server that is remote from the user's device.

The listing of applications that is automatically presented to the user is filtered according to the information about the user and/or the information about the applications associated with the user. These may include applications owned by the user, applications shared by the user with other users, applications borrowed from other users and applications to which the user otherwise has access. The list of applications to which the user has access may be filtered so that a few of the most relevant applications are presented most prominently. By way of example, and not by way of limitations, the system can filter the list of applications presented to the user so that those most recently used or most frequently appear more prominently, e.g., at the top of the list.

Figure 4A:
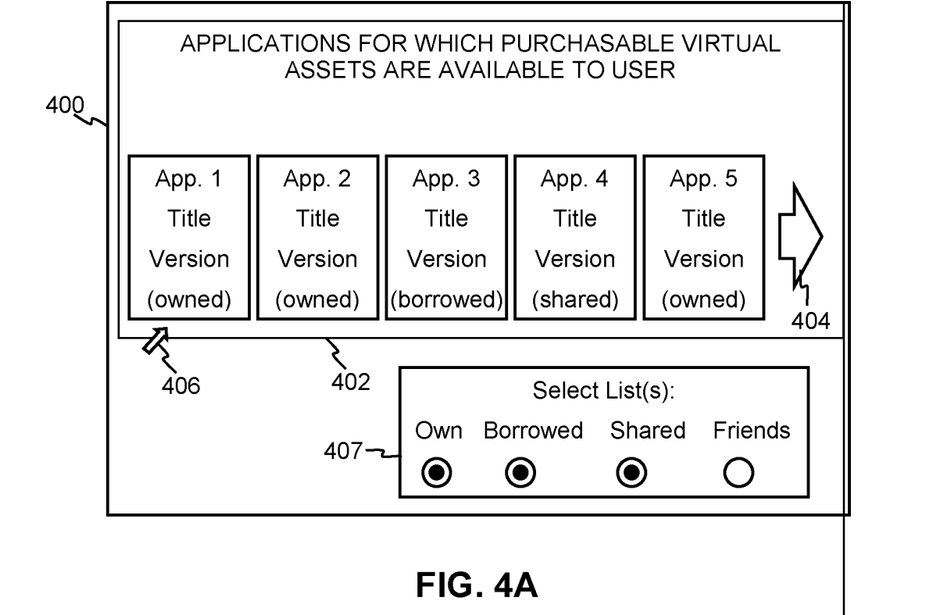
FIG. 4A is a screen shot illustrating an example of a filtered listing of applications for which purchasable virtual assets are available presented to a user in accordance with aspects of the present disclosure.

FIG. 4A depicts a screen shot showing an example of how such a filtered listing may be presented to the user. In the illustrated example, the screen 400 shows the user a list 402 showing icons representing 5 different applications. Applications 1, 2, and 5 are owned by the user. Application 3 is borrowed and application 4 is shared with other users. Here, the system shows only five application icons. The user may own additional applications but the system has presented the five most relevant applications as determined from the user information 303A and/or application information 303B. In this example, the user can view additional applications by clicking on the arrow 404 to the right of the icons using a cursor 406.

In some implementations, the list 402 may be selectively limited to display only those applications that are owned or only those that are borrowed. In other implementations, the list 402 may display a listing of applications to which the user has opportunity to access through the user's association with other users. Such applications may include applications that are shared with others or those that are separately owned by others associated with the user, e.g., the user's friends, which the user may be able to borrow. There are a number of ways in which a system could determine which other users are associated with a given user. For example, and without limitation, other users could be associated with given user through social media. One or more other users could be associated with the given user through a multi-user online application, e.g., a multiplayer online game. The given user and another user could have gifted or lent each other applications or virtual assets in the past. The given user and another user could have communicated over voice chat feature of one or more applications. Information regarding associations between the given user and other users could be included in the user information 303A. Collection of such information is greatly facilitated where applications are accessed and used via a common networking system associated with the game that the given user and other users can access.

In some implementations the screen may present an interactive selector 407 that allows the user to select criteria upon which the list 402 that will be based. In the illustrated example, the selector 407 includes radio buttons that allows the user to select or de-select whether the list 402 is based on applications that are owned, borrowed, shared, or belong to friends. The user can select or de-select the appropriate radio buttons with the cursor 406.

When the user selects an application on the filtered listing 402, as indicated at 308, the system automatically presents to the user a filtered catalog of purchasable virtual assets that are available to the user for the selected application, as indicated at 310. The filtered catalog of purchasable virtual assets is filtered according to the information about the user and/or the information about one or more computer applications associated with the user.

There are a number of ways in which the system can filter the list of virtual assets for each application according to user information 303A. For example, the catalog may be filtered according to the user demographic information, e.g., some add-ons might not be age-appropriate. The catalog presented could omit such virtual assets. The catalog may also be filtered according to the geographic information, e.g., certain virtual assets might not be available in certain areas. The catalog presented could omit such virtual assets. Furthermore, the catalog may be filtered according to device information, e.g., certain add-ons might not be available for use with certain machines. The catalog presented could omit such virtual assets. The filtering of the catalog of virtual assets could also be application context-dependent. For example, in the context of gaming applications, availability of some add-ons might be contingent upon the user accomplishing certain achievements within a game. The catalog presented could omit such virtual assets or indicate the nature of the contingency.

Figure 4B:
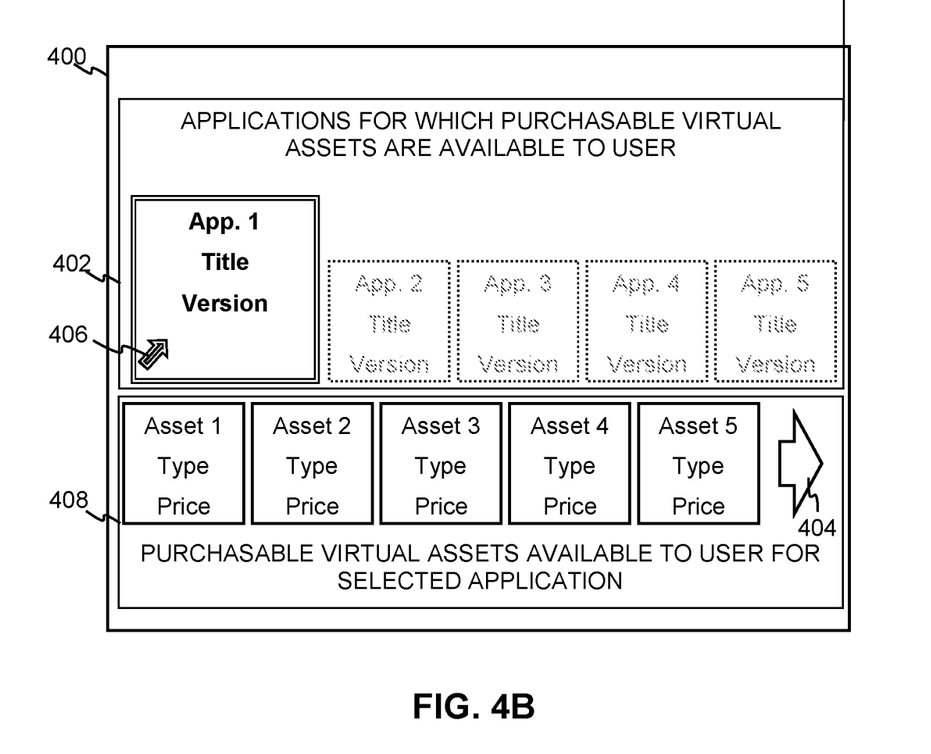
FIG. 4B is a screen shot illustrating an example of a filtered catalog of purchasable virtual assets that are available to a user for the selected application presented to a user in accordance with aspects of the present disclosure.

FIG. 4B depicts a screen shot showing an example of how such a catalog may be presented to the user. In the illustrated example, the screen 400 shows the user the list 402 with the icons representing the 4 different applications depicted in FIG. 4A. Here, the user has clicked on application 1 using the cursor 406 and the screen shows a catalog 408 with five virtual asset icons. In the illustrated example, each icon identifies the type of asset and a price to purchase the asset. Clicking on one of the asset icons may direct the user to a purchase page where the user can complete a transaction to purchase the asset. The catalog 408 may contain additional virtual assets but, if screen space is limited, the system might present the five most relevant assets as determined from the user information 303A and/or application information 303B. In this example, the user can view additional assets by clicking on the arrow 404 to the right of the icons using the cursor 406.

Referring again to FIG. 3, as noted above, the user may select a particular asset from the catalog for purchase. In such cases, the system may receive a purchase request from the user, as indicated at 312. The system may then deliver the asset (or access to the asset) to the user, as indicated at 314. In some implementations, the system may provide the user with an option to transfer the asset to another user, as indicated at 316. If the user elects this option, the system may then transfer the asset (or access to the asset) to the other user identified by the user who purchased the asset, as indicated at 318.

As discussed above, certain aspects of the present disclosure may apply to situations where a first user has lent a game to a second user who wishes to purchase add-ons for the borrowed game. According to aspects of the present disclosure, an application delivery service may allow for a user (the borrower) to borrow an application from another user (the lender) and purchase virtual assets that are available for use with the borrowed applications but which the borrower (or lender) does not own. Additionally, the application delivery service may present users with a catalog of one or more virtual assets for applications they don't currently own but may be interested in owning or trying. For example, a user may enjoy a game they borrowed and purchase a virtual asset on the expectation that they will purchase the game and the virtual asset will be available for them to use after the purchase. Alternatively, the user may purchase a virtual asset for a borrowed game as a gift for the lender.

Figure 5:
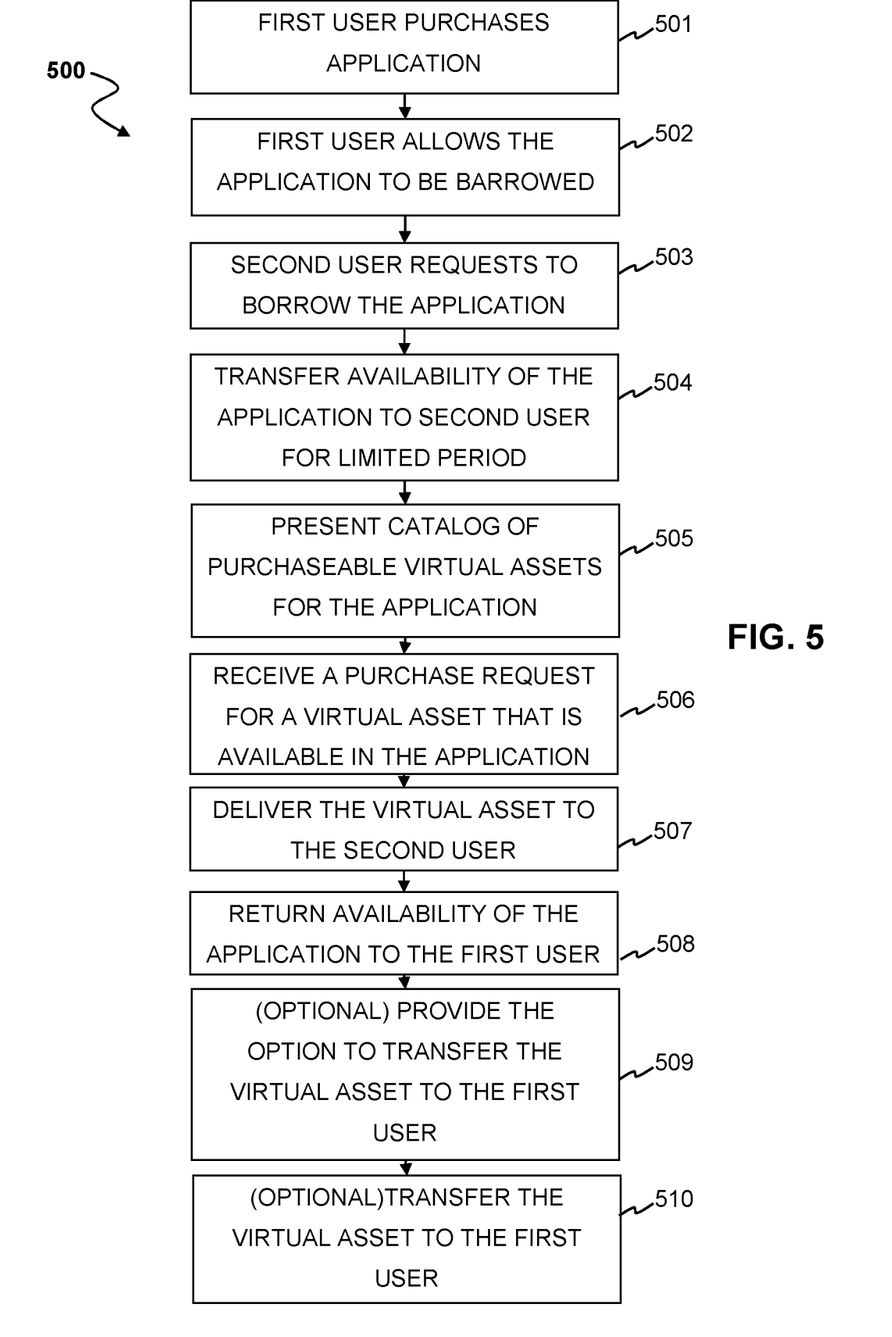
FIG. 5 is a flow diagram of a method for acquiring virtual assets in a borrowed application according to an embodiment of the present invention.

FIG. 5 shows a method for lending a virtual asset from a first user to a second user wherein the second user can purchase assets for the borrowed application. A virtual marketplace running on a remote server may provide an interface that allows a first user of the virtual marketplace to purchase an application, as indicated at 501. The application may be a video game, photo-editing program, music editing program, document-editing program, or the like. After purchasing the application the first user may be given the option to allow other users to borrow the application, as indicated at 502. A second user may send a request to the virtual market place to borrow the application from the first user, as indicated at 503.

Alternatively, the first user may simply send a message to the second user through the market place asking to borrow the application and the second user may send a message to the marketplace indicating that the first user is allowed to borrow the application. In this context borrowing, means that the application is, for a limited period of time, made unavailable to the first user, e.g., disabled or otherwise removed from the first user's device, and made available to the second user, e.g., downloaded, installed, or otherwise enabled on the second user's device. The "limited period of time" may be a fixed period of time, e.g., minutes, hours, days, weeks, months, or years, determined before or at the time the game is lent. Such a fixed period may be established by the first user, the second user, the virtual market place, or some mutual agreement among two or more of these entities. Alternatively, the duration of the "limited period of time" may be undetermined at the time the game is lent to the second user. For example, the application may be made available to the second user, e.g., downloaded, installed or otherwise enabled on the second user's device, until the first user requests that the application be returned.

In general, the borrowing of a game involves the assent of the first user before the game is lent to the second user. In some implementations, assent of a marketplace system may be required. After the request by the second user to borrow the application has been approved, the marketplace system transfers availability of the application from the first user to the second user, as indicated at 504. The application may be transferred by way of example and not by way of limitation allowing the second user to download the application from a database in connection with the marketplace server or from a memory of the marketplace server or from a peer to peer connection with the first user. Additionally, before, during or after the transfer the Application is removed or disabled for the user. In some implementations, e.g., cloud-based gaming, the bulk of the application code and data may be stored on an application server that users can access on different devices via user accounts. In such implementations, transfer of availability may be handled by the application server disabling access to the application from the first user's account while enabling access to the application from the second user's account. Such implementations may further involve the marketplace system sending executable code (e.g., for a user interface) and or machine-readable data (e.g., encryption keys) to the second user's device so that second user can communicate with the application server.

While the second user is borrowing the application, a catalog of virtual assets for the application may be presented to the second user, as indicated at 505. The marketplace may present the catalog to the second user, e.g., by directing the second user to a web page that the second user can access via a browser on the second user's device. In some implementations according to aspects of the present disclosure the catalog of purchasable virtual assets for the application may be presented to the second user before sending the request to borrow the application from the first user at 503. By way of example and not by way limitation the virtual market place server may provide images of or lists of virtual assets for the application to the second user if the second user is friends with someone that owns the application or uses the application more than a threshold frequency, on a social media platform. In other embodiments the catalog of purchasable virtual assets may be presented to the second user if they recently clicked on an advertisement for the application or viewed a store page for the application.

The second user may purchase an asset for the application that the second user does not own, as indicated 506. The purchase may occur before the second user borrows the application from the user and the virtual asset may be delivered to the user in the form of a receipt or some other proof of purchase which the second user may redeem for the virtual asset, as indicated at 507. Alternatively, the second user may purchase the virtual asset after they have borrowed the application. In this case the virtual asset may be immediately delivered to the second user at 507. By way of example, and not by way of limitation, the virtual asset may be delivered to the second user by downloading executable code and/or machine-readable data representing the virtual asset within the application. Alternatively, the virtual asset may be delivered to the second user by enabling use of the virtual asset within the Application, e.g., through change of an access code associated with the second user's account. In some embodiments the second user may receive at least one warning that they are buying a virtual asset for an application that they do not own. Additionally the second user may be given the option to purchase the application or ask to borrow the application from another user.

In some implementations, the marketplace system may determine whether the first user is a friend of the second user and, if so, may present the second user with a catalog of other purchasable virtual assets that are available in other applications owned by the first user.

There are a number of ways in which friendship between the first and second users may be determined. For example, the marketplace may be associated with or otherwise have access to data for a social media platform and the first and second users may indicate that they are friends on the social media platform. Alternatively, such friendship information may be directly associated with user accounts for both users on the application server.

After receiving the borrowed application from the first user the second user may use the application for a limited period of time. In some embodiments the limited period of time is chosen by the first user before the second user receives the application. In other embodiments the second user specifies the length of the borrowing period as part of the request to borrow the application from the first user. Alternatively, the first user may have the option to request the application be returned while the application is being borrowed by the second user. In some implementations, the marketplace system may determine or have a role in determining the limited period of time over which the application may be borrowed. In any case availability of the application is returned to the first user after the borrowing period has ended, as indicated at 508. Similar to delivering availability of the application to the second user, the first user may receive the application by downloading the application again. Alternatively the application may have been disabled when the first user chose to lend the application to the second user and in which case the application may be re-enabled. In some implementations, the lending user may receive a warning when downloading a game or add-ons or updates for a game that has been lent out to another user that the game currently lent this game to the other user. Disabling and re-enabling the application may come in the form of encrypting and decrypting the application data respectively. The first user may receive a decryption key allowing decryption of the encrypted application after the borrowing period has ended. In other implementations, the marketplace system may simply enable access to the application from the first user's account and disable access to the application from the second user's account.

In some embodiments of the present disclosure the second user is provided the option to transfer the virtual asset to the first user after borrowing the application, as indicated at 509. The second user may be provided this option before borrowing the application or after purchasing the virtual asset or after transferring the application back to the first user or any other period during which the second user owns the virtual asset. In some embodiments second user may choose to send the virtual asset as a gift to the first for allowing them to borrow the application and in which case there may be gift options for the presentation of the virtual asset to the first user.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a server configured to operate on a network, a method for secured lending of digital content, comprising:
    analyzing information about a first user and a second user with a neural network trained with a machine learning algorithm to determine a relationship between the first user and the second user, wherein the information indicates whether the first user has access to a device of the second user or the second user has access to a device of the first user;
    granting the first user access to one or more content items belonging to the second user based on the determined relationship and disabling the second user's access to the one or more content items belonging to the second user; and
    disabling the first user's access to the one or more content items belonging to the second user when the second user requests access to the one or more content items and returning access of the one or more content items to the second user after access for the first user to the one or more content items has been disabled.

2. The method of claim 1, wherein granting the first user access to the one or more content items belonging to the second user includes granting the first user access to an application owned by the second user, wherein the one or more content items belonging to the second user are associated with the application owned by the second user.

3. The method of claim 1, wherein granting the first user access to the one or more content items belonging to the second user includes granting the first user temporary access to an application owned by the second user, wherein the one or more content items belonging to the second user are associated with the application owned by the second user.

4. The method of claim 1, wherein granting the first user access to the one or more content items belonging to the second user includes granting the first user access to an application owned by the second user for a limited period of time and disabling the second user's access to the application for the limited period of time, wherein the one or more content items belonging to the second user are associated with the application owned by the second user.

5. The method of claim 1, wherein granting the first user access to the one or more content items belonging to the second user includes granting the first user access to an application owned by the second user, disabling the second user's access to the application, and returning access to the application to the second user upon request by the second user, wherein the one or more content items belonging to the second user are associated with the application owned by the second user.

6. The method of claim 1, wherein granting the first user access to the one or more content items belonging to the second user includes granting the first user access to an application owned by the second user, disabling the second user's access to the application.

7. The method of claim 6, wherein granting the first user access to the application includes granting an account belonging to the first user access to an application server associated with the application.

8. The method of claim 7, wherein granting the account belonging to the first user access to the application server includes sending executable code to the device of the first user.

9. The method of claim 8, wherein the executable code includes executable code for a user interface.

10. The method of claim 7, wherein granting the account belong to the first user access to the application server includes sending machine-readable data to the device of the first user.

11. The method of claim 10, wherein machine-readable data includes one or more encryption keys.

12. The method of claim 6, wherein disabling the second user's access to the application includes denying an account belonging to the second user access to an application server associated with the application.

13. The method of claim 6, further comprising subsequently returning access to the application to the second user.

14. The method of claim 13, wherein disabling the second user's access to the application includes denying an account belonging to the second user access to an application server associated with the application.

15. The method of claim 1, wherein subsequently returning access to the application to the second user includes sending executable code to a device belonging to the second user.

16. The method of claim 1, wherein the executable code includes executable code for a user interface.

17. The method of claim 1, wherein subsequently returning access to the application to the second user includes sending machine-readable data to the device of the second user.

18. The method of claim 1, wherein the machine-readable data includes one or more encryption keys.

19. The method of claim 1, further comprising providing access to one or more assets purchased by the first user for the one or more content items belonging to the second user but not the first user.

20. The method of claim 19 further comprising: providing the first user an option to transfer access rights of the one or more assets to the second user.

21. The method of claim 1, wherein the one or more content items include one or more computer applications, the method further comprising:
   transferring availability of a computer application owned by the second user to the first user from the second user for a limited period of time before the first user navigates the device of the first user to a catalog screen for virtual assets for computer applications; and
   automatically presenting to the first user a filtered catalog of purchasable virtual assets that are available to the first user for a selected application, wherein the filtered catalog of purchasable virtual assets is filtered according to information about the first user and/or information about one or more computer applications associated with the first user;
   wherein a filtered listing of applications for which purchasable virtual assets includes the computer application owned by the second user.

22. An apparatus for secured access to shared digital content, comprising:
   a memory;
   a processor coupled to the memory; and
   computer readable instructions embodied in the memory and executable by the processor that, when executed by the processor, cause the apparatus to implement a method, the method comprising:
   analyzing information about a first user and a second user with a neural network trained with a machine learning algorithm to determine a relationship between the first user and the second user, wherein the information indicates whether the first user has access to a device of the second user or the second user has access to a device of the first user;
   granting the first user access to one or more content items belonging to the second user based on the determined relationship and disabling the second user's access to the one or more content items belonging to the second user; and
   disabling the first user's access to the one or more content items belonging to the second user when the second user requests access to the one or more content items and returning access of the one or more content items to the second user after access for the first user to the one or more content items has been disabled.

23. A non-transitory computer readable medium having computer readable instructions embodied therein, the computer readable instructions being executable by a processor and configured such that, when executed by the processor, causes the processor to implement a method, the method comprising:
   analyzing information about a first user and a second user with a neural network trained with a machine learning algorithm to determine a relationship between the first user and the second user, wherein the information indicates whether the first user has access to a device of the second user or the second user has access to a device of the first user;
   granting the first user access to one or more content items belonging to the second user based on the determined relationship and disabling the second user's access to the one or more content items belonging to the second user; and
   disabling the first user's access to the one or more content items belonging to the second user when the second user requests access to the one or more content items and returning access of the one or more content items to the second user after access for the first user to the one or more content items has been disabled.

* * * * *